United States Patent
Ishiwata et al.

(10) Patent No.: US 9,548,160 B2
(45) Date of Patent: Jan. 17, 2017

(54) RAW SHEET FOR CAPACITOR FILM AND CAPACITOR FILM

(75) Inventors: Tadakazu Ishiwata, Chiba (JP); Manabu Furukawa, Koka (JP); Fumio Jinno, Tokyo (JP)

(73) Assignee: OJI HOLDINGS CORPORATION, Tokyo (JP)

(*) Notice: Subject to any disclaimer, the term of this patent is extended or adjusted under 35 U.S.C. 154(b) by 584 days.

(21) Appl. No.: 11/599,537

(22) Filed: Nov. 14, 2006

(65) Prior Publication Data

US 2007/0110974 A1   May 17, 2007

(30) Foreign Application Priority Data

Nov. 17, 2005 (JP) ............................... P2005-332547

(51) Int. Cl.
*H01G 4/18* (2006.01)
*C08J 5/18* (2006.01)

(52) U.S. Cl.
CPC . *H01G 4/18* (2013.01); *C08J 5/18* (2013.01); *C08J 2323/12* (2013.01)

(58) Field of Classification Search
CPC .................................... H01G 4/18; C08J 5/18
USPC ......................................................... 428/461
See application file for complete search history.

(56) References Cited

U.S. PATENT DOCUMENTS

| 4,138,520 | A | | 2/1979 | Sato et al. |
| 5,724,222 | A | * | 3/1998 | Hirano et al. ............... 361/311 |
| 6,537,652 | B1 | | 3/2003 | Kochem et al. |
| 6,635,734 | B2 | * | 10/2003 | Shamshoum et al. ........ 526/351 |
| 2004/0171782 | A1 | * | 9/2004 | Lin et al. ...................... 526/351 |
| 2004/0204310 | A1 | * | 10/2004 | Gauthier et al. ............. 502/103 |
| 2008/0042323 | A1 | * | 2/2008 | Inukai et al. ............. 264/328.1 |

FOREIGN PATENT DOCUMENTS

| JP | A-61-110906 | 5/1986 |
| JP | 08294962 | 11/1996 |
| JP | A-09-270364 | 10/1997 |
| JP | 09-324014 | 12/1997 |
| JP | A-10-156939 | 6/1998 |
| JP | 11147962 | 6/1999 |
| JP | A-11-273990 | 10/1999 |
| JP | A-2000-313751 | 11/2000 |
| JP | A-2001-002805 | 1/2001 |
| JP | A-2001-040147 | 2/2001 |
| JP | A-2001-106804 | 4/2001 |
| JP | A-2002-105224 | 4/2002 |
| JP | T-2002-528875 | 9/2002 |
| JP | 2004002655 | 1/2004 |
| JP | 2004175932 | 6/2004 |
| JP | A-2004-161799 | 6/2004 |
| JP | A-2004-175933 | 6/2004 |
| JP | A-2005-064067 | 3/2005 |
| JP | 2005089683 | 4/2005 |
| JP | B-3654540 | 6/2005 |
| JP | A-2006-083253 | 3/2006 |
| JP | A-2006-093688 | 4/2006 |
| JP | 2007-308604 A | 11/2007 |
| WO | WO 99/07752 A1 | 2/1999 |
| WO | 2006/057066 * | 6/2006 |

OTHER PUBLICATIONS

Lotz, B "Alpha and Beta phases of istotactic polyproylene: a case of growth kinetics phase reetrency in polymer crystallization;" Polymer vol. 39 No. 19, pp. 4561-4567 (1998).*
"Polymers & Polymer Composites" Adam Hoza, Jan Kratochvil and Sona Hermanova; Chem. Listy, 102, s1202-s1206 (2008).*
Japan Society for Analytical Chemistry, "High Polymer Analysis Handbook", Council for Analytical Research of High Plymer, Kinokuniya Company Ltd., 1995, p. 612-614.
Jones et al. "Crystalline Forms of Isotactic Polypropylene", Makrornol.Chem., vol. 75, 1964, p. 134-158.
Kuriya, Hiroshi, "Introduction to high polymer under polarizing microscope", Agne Gijyutsu Center, 2001, p. 126-130.
Notice of Reasons for Rejection in corresponding Japanese Patent Application No. 2005-332547 mailed Sep. 14, 2010.
Decision of Rejection in corresponding Japanese Patent Application No. 2005-332547 mailed Jan. 18, 2011.
Notice of Reasons for Rejection in corresponding Japanese Patent Application No. 2007-272616 mailed Jul. 26, 2011.
Office Action mailed Jul. 3, 2012 in corresponding Japanese Application No. 2007-272616.

* cited by examiner

*Primary Examiner* — Kevin R Kruer
(74) *Attorney, Agent, or Firm* — Knobbe, Martens, Olson & Bear, LLP

(57) ABSTRACT

A cast raw sheet for a capacitor film, prepared by heating and melting a polypropylene resin and extruding the resin from a T-die, wherein the polypropylene resin has: a weight average molecular weight, determined by gel permeation chromatography, of 100,000 or more and 500,000 or less; and a molecular weight distribution Mw/Mn of 7 or more, the resin contains 97% by mass or more of an isotactic component that is an extraction residue obtained by sequential extraction, and the cast raw sheet contains a β-form in a proportion of 1% or more and less than 20%, the proportion being determined by X-ray diffraction intensity.

6 Claims, No Drawings

1

RAW SHEET FOR CAPACITOR FILM AND CAPACITOR FILM

RELATED APPLICATION

The present invention claims priority to Japanese Patent Application No. 2005-332547 filed on Nov. 17, 2005, the contents of which are incorporated herein by reference.

BACKGROUND OF THE INVENTION

Field of the Invention

The present invention relates to an oriented capacitor film having a high voltage resistance, an extremely thin film thickness, and an excellent processing suitability for winding elements or the like, and also relates to a cast raw sheet available for producing the capacitor film.

Description of the Related Art

A biaxially oriented polypropylene film has been widely used as a raw film for industrial application such as a packaging film. Moreover, the biaxially oriented polypropylene film has also been used as a dielectric film for a capacitor, because the biaxially oriented polypropylene film has a particularly high humidity resistance in addition to excellent electronic properties such as a high voltage resistance and low dielectric loss characteristics, these properties being advantageous in capacitor applications.

When the biaxially oriented film is used as a capacitor film, the surface thereof is required to be finely roughened in moderation so as to improve the following properties: processing suitability for winding elements at the time of producing a capacitor; sliding properties of the film at the time of processing the film; and oil impregnation properties when the film is applied to an oil-impregnated capacitor (see Patent Document 1: Japanese Unexamined Patent Application, First Publication No. S 51-63500, pages 2-4).

As methods for finely roughening the surface, various methods such as mechanical methods such as an embossing method or sandramie method, chemical methods such as a chemical etching method using solvents, methods of drawing sheets in which dissimilar polymers are blended or copolymerized, or sheets in which a β-form is formed, have been conventionally proposed (see, for example, Patent Document 1).

According to "Introduction to high polymer under polarizing microscope" attributed to Hiroshi Kuriya, published by AGNE GIJYUTSU CENTER, page 131, 2001, polypropylene resins usually have crystal polymorphism such as α-form, β-form, or the like.

The β-form has a low density, a low melting point, and other different physical properties, in comparison to the α-form. When a molten polypropylene resin is crystallized within a particular temperature range, the β-form is generated. When this β-form is drawn at the vicinity of the melting point thereof, a spherulite of β-form transfers to a spherulite of α-form with a density different from that of β-form. The density-difference between these crystal forms generates fine unevenness on the film surface. When the surface is roughened by this method, impurities such as additives are not required to be added to the resin. Accordingly, this method is advantageous in forming extremely fine unevenness without deteriorating electric characteristics thereof.

When the surface is roughened by the β-form, how the generation of the β-form is controlled at the time of producing a sheet is technically important. As for the generation of the β-form, Patent Documents 2 to 4 (Japanese Unexamined Patent Application, First Publication No. 2004-2655, pages 3 to 7; Japanese Unexamined Patent Application, First Publication No. 2004-175932, pages 4 to 8; Japanese Unexamined Patent Application, First Publication No. 2005-89683, pages 5 to 7), for example, disclose that a sheet with a high β-form proportion can be produced from a polypropylene resin obtained by polymerization using a particular catalyst, the polypropylene resin having a certain range of melt flow rate, molecular weight, and molecular weight distribution.

In addition, as for the preparation of an oriented polypropylene film with a roughened surface, Patent Document 5 (Japanese Patent Publication No. 3,508,515, pages 2 to 3) discloses a manufacturing technique in which a polypropylene raw resin with a particular stereoregularity is used to control the content of β-form in a cast raw sheet to a particular content or more.

However, such a surface roughening generally has the disadvantage of inviting a degradation of voltage resistance, although the surface roughening is essential to enhance the processing suitability. In contrast, demand for an industrial capacitor has increased, and a request for a capacitor with a higher voltage resistance is very strong in the market. In addition to this request, further enhancement of the electric capacity is also requested.

The voltage resistance can be enhanced by increasing the smoothness of the surface, or making a polypropylene resin have high stereoregularity and crystallinity in accordance with Patent Document 6 (Japanese Unexamined Patent Application, First Publication No. H 8-294962, pages 2 to 3), for example.

However, high crystallinity causes deterioration of the extensibility and causes the film to be easily torn at the time of drawing, which is unfavorable for manufacturing the film.

On the other hand, a dielectric film is required to be thin so as to enhance the electric capacity of a capacitor while maintaining a constant volume. In order to produce such a thin film, the extensibility of a resin and a cast raw sheet is required to be enhanced. However, the enhancement of the extensibility is generally incompatible with the enhancement of the voltage resistance, that is, crystallinity enhancement, as described above.

Thus, a capacitor film and a raw sheet thereof satisfying the following three characteristics required by the market: (1) processing suitability for producing a capacitor (roughened surface), (2) high voltage resistance (smoothed surface, high crystallinity), and (3) high electric capacity (high extensibility for producing an extremely thin film) have not been provided till now.

SUMMARY OF THE INVENTION

The present invention includes the following aspects.

(1) A cast raw sheet for a capacitor film, prepared by heating and melting a polypropylene resin and extruding the resin from a T-die, wherein the polypropylene resin has: a weight average molecular weight, determined by gel permeation chromatography (GPC), of 100,000 or more and 500,000 or less; and a molecular weight distribution Mw/Mn of 7 or more, the resin contains 97% by mass or more of an isotactic component (stereoregular component contained in the resin) that is an extraction residue obtained by sequential extraction, and the cast raw sheet contains a β-form in a proportion of 1% or more and less than 20%, the proportion being determined by X-ray diffraction intensity.

(2) The cast raw sheet for a capacitor film according to (I), wherein the polypropylene resin is a polypropylene resin prepared by subjecting a propylene monomer to a slurry polymerization.

(3) The cast raw sheet for a capacitor film according to (2), wherein the slurry polymerization of the propylene monomer is a multistage polymerization reaction using plural polymerization reactors.

(4) The cast raw sheet for a capacitor film according to any one of (1) to (3), wherein the weight average molecular weight of the polypropylene resin, determined by GPC, is 100,000 or more and 500,000 or less, preferably 200,000 or more and 400,000 or less, and more preferably 250,000 or more and less than 400,000.

(5) The cast raw sheet for a capacitor film according to any one of (1) to (4), wherein the polypropylene resin contains a stereoblock (intermediately-stereoregular) component in a proportion of 0.5% by mass or more and less than 2% by mass, the proportion being determined by sequential extraction.

(6) The cast raw sheet for a capacitor film according to any one of (1) to (5), wherein the polypropylene resin has a crystallization rate $(1/t_{1/2})$ of 0.6 $\text{min}^{-1}$ or more and less than 3 $\text{min}^{-1}$, the crystallization rate being determined at a crystallization temperature of 120° C. using a differential scanning calorimeter (DSC).

(7) A capacitor film prepared by biaxially drawing (orienting) the cast raw sheet of any one of (1) to (6), wherein the thickness thereof is 1 μm or more and 7 μm or less.

DETAILED DESCRIPTION OF THE INVENTION

An object of the present invention is to provide an oriented capacitor film with an extremely thin film thickness, a high voltage resistance, and an excellent processing suitability for winding elements or the like, and also to provide a polypropylene cast raw sheet available for producing the capacitor film.

According to the present invention, the cast raw sheet for a capacitor film is prepared by heating and melting a polypropylene resin and extruding the resin from a T-die, wherein the polypropylene resin has: a weight average molecular weight, determined by gel permeation chromatography, of 100,000 or more and 500,000 or less; and a molecular weight distribution Mw/Mn of 7 or more, the resin comprises 97% by mass or more of an isotactic component (stereoregular component contained in the resin) that is an extraction residue obtained by sequential extraction, and the cast raw sheet contains a β-form in a proportion of 1% or more and less than 20%, the proportion being determined by X-ray diffraction intensity.

The polypropylene resin used in the present invention is specifically a crystalline isotactic polypropylene resin, and more specifically a homopolymer of propylene or a copolymer of propylene and either ethylene or α-olefin having 4 to 10 carbon atoms. As the α-olefin having 4 to 10 carbon atoms, generally well known α-olefins such as 1-butene, 1-pentene, 1-hexene, or the like, can be used. Ethylene or α-olefin may be copolymerized with propylene by random copolymerization or block-copolymerization. The content of the copolymerized ethylene or α-olefin in the polypropylene resin is preferably 2% by mole or less, and more preferably 1% by mole or less.

The weight average molecular weight, determined by gel permeation chromatography, of the polypropylene resin used in the present invention is 100,000 or more and 500,000 or less. More preferably, the weight average molecular weight thereof is 200,000 or more and 400,000 or less. Even more preferably, the weight average molecular weight thereof is 250,000 or more and less than 400,000. When the weight average molecular weight exceeds 500,000, the flowability of the resin significantly decreases, so it becomes difficult to control the film thickness of the cast raw sheet. As a result, an oriented thin film cannot be produced with precision in the width direction. Thus, the weight average molecular weight over 500,000 is unfavorable from a practical standpoint. In contrast, when the weight average molecular weight is less than 100,000, extrusion formability is excellent, but the extensibility significantly decreases in accordance with a decrease of mechanical properties of a formed sheet, and so biaxial drawing cannot be conducted. Thus, the weight average molecular weight below 100,000 has the disadvantage in manufacturing.

The gel permeation chromatography (GPC) used for measuring the molecular weight is not particularly limited, and a commercially available high-temperature type GPC that enables measuring of the molecular weight of polyolefins may be used without exception. In particular, the molecular weight is determined using a differential refractometer (RI) built-in mode high-temperature GPC (HLC-8121GPC-HT manufactured by TOSOH CORPORATION) having a GPC column linked with three TSK gel $\text{GMH}_{HR}$-H (20) HT manufactured by TOSOH CORPORATION. The temperature of the column is adjusted at 145° C., trichlorobenzene is used as an eluant, and the flow rate is set at 1.0 ml/min. A calibration curve is made using a standard polystyrene manufactured by TOSOH CORPORATION and measured results are converted into polypropylene values.

Moreover, the molecular weight distribution (Mw/Mn) of the polypropylene resin, calculated by dividing the weight average molecular weight (Mw) by the number average molecular weight (Mn), is 7 or more, and more preferably 7.5 or more. When the molecular weight distribution is 7 or more, the extensibility of the polypropylene resin can be improved. In contrast, the molecular weight distribution is preferably 20 or less, and more preferably 15 or less.

Moreover, the polypropylene resin used in the present invention is further required to contain 97% by mass or more of an extraction residue (isotactic component) obtained by sequential extraction. Sequential extraction is one of the fractionation methods using differences of stereoregularity of components contained in the polypropylene resin. This sequential extraction can achieve more accurate and detailed fractionation than an extraction using n-heptane only, the extraction being the simplest and easiest method conventionally used, and an extraction residue obtained by the extraction being generally called a heptane index (HI) or isotactic index (II). The sequential extraction is carried out by conducting extractions sequentially using plural solvents having different boiling points thereof to determine the distribution of the stereoregularity of the polypropylene resin from the weights of the extracts. In particular, the sequential extraction may be carried out in accordance with a method described in "High Polymer Analysis Handbook", New Edition, edited by Japan Society for Analytical Chemistry, Council for Analytical Research of High Polymer, KINOKUNIYA COMPANY LTD., 1995, Page 613. In the following, this method will be explained in more detail.

First, the polypropylene resin is sufficiently dissolved in xylene (1) under reflux, and then left to stand still at room temperature for 4 hours. Then, components insoluble in xylene are collected by filtration, and the insoluble components are subjected to the following extractions. A soluble component is dried to remove xylene, and weighed. This mass of the soluble component is equivalent to the mass of a so-called amorphous atactic component.

The insoluble components are subjected to Soxhlet extractions each for 6 hours, sequentially using n-pentane (2), n-hexane (3), and n-heptane (4), as each solvent, with a Soxhlet type fat extraction apparatus. A component with a lower crystallinity (lower stereoregularity) is extracted with a solvent with a lower boiling point. A component insoluble in n-heptane (4) is defined as an "isotactic" component with an extremely high stereoregularity, and the proportion thereof is shown by the mass proportion of the final extract residue.

On the other hand, each component soluble in the solvents (2) to (4) is mainly composed of a polymer having an intermediate-stereoregularity, the polymer being referred to as a "stereoblock".

As thus described, the proportion in the stereoregularity distribution determined by the sequential extraction method is different from the proportion determined by extraction using a single solvent, such as the proportion of the so-called heptane-insoluble component (HI value) or II value.

According to the present invention, the proportion of the final extraction residue obtained by sequential extraction, that is, the proportion of the isotactic component obtained by sequential extraction, is defined as an index of stereoregularity, and is required to be 97% by mass or more, and preferably 97.5% by mass or more and 99% by mass or less. When the polypropylene resin has a highly stereoregular component in an isotactic proportion of 97% by mass or more, the crystallinity of the resin is improved, thereby realizing high voltage resistance. However, when the isotactic proportion is extremely high, there is a difficulty in manufacturing the cast raw sheet, because the solidification (crystallization) proceeds rapidly at the time of forming the cast raw sheet, so the sheet tends to easily flake from the metal drum used for forming the sheet, for example. Accordingly, it is preferable that the isotactic proportion be 99% by mass or less.

The cast raw sheet according to the present invention is characterized by being prepared using the resin satisfying this high isotactic proportion as well as the above-defined range of the weight average molecular weight and the molecular weight distribution. In general, enhancement of the stereoregularity (that is, crystallinity) can realize high voltage resistance, but cannot realize high extensibility, and so an extremely thinly oriented film cannot be produced. However, according to the present invention, since the resin has a broad range of molecular weight distribution combined with high stereoregularity, extensibility can also be realized. That is, when the resin has a molecular weight distribution Mw/Mn of 7 or more while maintaining high stereoregularity, so-called ultrahigh-molecular-weight components suitably exist, and realize suitable extensibility. Moreover, low-molecular-weight components contained play a similar role to that of a plasticizer to facilitate the orientation and transfer of the ultrahigh-molecular-weight components, as a result of which the extensibility is further enhanced.

As a polymerization method for producing such a polypropylene resin having a high stereoregularity together with a broad range of the molecular weight distribution, a method containing at least a step of conducting slurry polymerization is preferably used. Moreover, the method may utilize a multistage polymerization reaction conducted in at least two reactors, and more preferably 2 to 5 reactors. In this reaction, a hydrogen or comonomer may be used as a molecular weight modifier. In the most preferable embodiment, plural slurry polymerization reactors linked in series with each other are used, and the kind and amount of a catalyst to be filled in each reactor and the amount of the molecular weight modifier to be filled in each reactor are controlled so as to produce polypropylene resins with different molecular weights at each reactor, as a result of which the range of the molecular weight distribution of the thus finally obtained polypropylene resin becomes broad. When the polymerization is conducted by a slurry polymerization, the molecular weight and the reaction can be easily controlled.

The catalyst used is not particularly limited, and Ziegler-Natta catalysts generally known may be used. Also, a cocatalyst component or a donor may be contained.

The polypropylene resin with the above-mentioned characteristics, obtained by such a slurry polymerization, is heated and melted preferably at 170° C. to 320° C., and more preferably 200° C. to 300° C., and then extruded from a T-die. The extruded resin is cooled and solidified using a metal drum of which the temperature is held preferably at 70° C. to 140° C., and more preferably 80° C. to 120° C., as a result of which a cast raw sheet is obtained. The thus obtained cast raw sheet contains a β-form in a proportion of 1% or more and less than 20%, and preferably 5% or more and less than 20%. Note that this temperature range is applicable when a β-form nucleating agent is not used.

In accordance with the enhancement of the stereoregularity, the generation of the β-form of the cast raw sheet before orientation is conventionally facilitated and so the proportion of β-form is raised. However, according to the present invention, the generation of β-form tends to be suppressed in spite of the high proportion of isotactic component (sequential extraction residue). This may be an effect exhibited by balancing the stereoregularity and the molecular weight distribution.

As described above, although the extremely low β-form proportion smoothens the film surface, which is unsuitable for winding elements or the like, the low β-form proportion increases the voltage resistance. The range of the β-form proportion according to the present invention sufficiently satisfies both properties. That is, when the β-form proportion is less than 1%, an obtained film becomes too smooth to wind elements. On the other hand, when the β-form proportion is no less than 20%, the voltage resistance decreases. When the β-form proportion is 1% or more and less than 20%, both properties can be satisfied in a balanced manner.

The β-form proportion is determined by measuring the X-ray diffraction intensity and conducting a calculation in accordance with a method described in Makrornol. Chem., vol. 75, page 134 (1964), A. Turner-Jones et al., the thus calculated value being referred to as the K value. In more detail, the β-form proportion (K value) is calculated by summing the intensity of three diffraction peaks of an α-form origin and dividing the sum by the intensity of one diffraction peak of a β-form origin.

In particular, the X-ray diffraction intensity is measured using an X-ray diffractometer (RINT-2200 manufactured by Rigaku Corporation) under the following conditions: X-ray source of CuKα line; irradiation output of 40 KV-40 mA; scattering slit of 1 deg; receiving slit of 0.3 mm; and scanning rate of 1 deg/min.

In an aspect of the present invention, the proportion of the intermediately-stereoregular component(s) (stereoblock component(s)) in the polypropylene raw resin is 0.5% by mass or more and less than 2% by mass, the proportion being determined by sequential extraction.

As described above, the sequential extraction is carried out in accordance with the method described in "High Polymer Analysis Handbook", New Edition, edited by Japan Society for Analytical Chemistry, Council for Analytical Research of High Polymer, KINOKUNIYA COMPANY LTD., 1995, Page 613. In more detail, the polypropylene resin is sufficiently dissolved in xylene (1) under reflux, and then left to stand still at room temperature for 4 hours. Then, components insoluble in xylene are collected by filtration, and the insoluble components are subjected to the following Soxhlet extractions each for 6 hours, sequentially using n-pentane (2), n-hexane (3), and n-heptane (4), as each solvent, with a Soxhlet type fat extraction apparatus. Components soluble in the solvents (2) to (4) are intermediately-stereoregular component(s) (stereoblock component(s)) mainly composed of polymers called stereoblocks.

According to the present invention, both of the stereoregularity that improves the voltage resistance and the extensibility that enables thinning of the obtained film can be satisfied by controlling the content of the intermediately-stereoregular component(s) (stereoblock component(s)). The reason for this is that the intermediately-stereoregular component(s) (stereoblock component(s)) plays a role in balancing two incompatible components, that is, the isotactic component, which improves the voltage resistance but decreases the extensibility, and the atactic component, which improves the extensibility but decreases the voltage resistance. When the proportion of the intermediately-stereoregular component(s) is 0.5% by mass or more and less than 2% by mass, the voltage resistance can be improved without decreasing the extensibility.

In an aspect of the present invention, the crystallization rate $(1/t_{1/2})$ of the polypropylene resin is 0.6 $min^{-1}$ or more and less than 3 $min^{-1}$, the crystallization rate being determined at a crystallization temperature of 120° C. using a differential scanning calorimeter (DSC). The crystallization rate is indicated as a velocity calculated as an inverse of a half time $(t_{1/2})$ defined as a time in which a calorimetric value integrated with time reaches 50% of the total calorimetric value, the calorimetric value accompanying crystallization.

The crystallization rate $(1/t_{1/2})$ of more than 3 $min^{-1}$ means that the crystallization rate is so rapid that the polypropylene resin may be solidified immediately after extruding the resin from an extruder, as a result of which the adhesiveness of the extruded resin to a metal drum for manufacturing a cast raw sheet may decrease, the β-form may be generated unevenly, and the extensibility may deteriorate. On the other hand, the crystallization rate $(1/t_{1/2})$ of less than 0.6 $min^{-1}$ may cause problems in which the sheet is not formed at the time of sticking the extruded resin to the metal drum or the β-form is not formed.

The crystallization rate is determined using a differential scanning calorimeter (DSC). Examples of the DSC include a heat flux type DSC, a power-compensation type DSC, and other type DSCs, and these may be used without any particular limitations. Among these, the power-compensation type DSC is preferably used because it can rapidly change (rise and fall) the temperature of samples. Although the DSC is not particularly limited with respect to the maker or type thereof, Diamond DSC manufactured by PerkinElmer Japan Co., Ltd., is particularly used.

Specific conditions for measuring the crystallization rate using the DSC will be explained in the following. First, 5 mg of the polypropylene resin is filled into an aluminum sample holder, placed at the DSC, heated to 230° C., and then melted for 5 minutes. After that, the sample is cooled to a crystallization temperature of 120° C. at a rate of 100° C./min, and the temperature is maintained at the same level so as to measure the change of the calorimetric value. When the temperature of the sample reaches 120° C.±0.1° C., the time t is set as 0. Then, the calorimetric value integrated with time t is measured. As described above, the crystallization rate is calculated as an inverse of a half time $(t_{1/2})$ at which the integrated calorimetric value reaches 50% of the total calorimetric value.

According to the present invention, when a sheet or film is formed using the polypropylene resin as a raw material, resins other than the polypropylene resin may be blended, as needed, within a range without impairment of the effects of the present invention. Although the resins other than the polypropylene resin are not particularly limited, examples thereof include poly-α-olefins such as polyethylene, poly(1-butene), polyisobutene, poly(1-pentene), poly(1-methylpentene), and the like, copolymers of α-olefins such as ethylene-propylene copolymer, propylene-butene copolymer, ethylene-butadiene copolymer, and the like, random copolymers of vinyl monomer and diene monomer, such as styrene-butadiene random copolymer, block copolymers of vinyl monomer, diene monomer, and vinyl monomer, such as styrene-butadiene-styrene block copolymer, and the like.

Although the addition amount of the resins other than the polypropylene resin depends on the kind thereof, the amount may be determined without limitations, as long as the effects of the present invention are not affected. In general, the addition amount of the resins other than the polypropylene resin is preferably 10 parts by mass or less, and more preferably 5 parts by mass or less, with respect to 100 parts by mass of the polypropylene resin.

When a cast raw sheet or an oriented film is formed using the polypropylene resin as a raw material, a stabilizer such as an antioxidant, ultraviolet absorber, hydrochloric acid absorber, or the like, or an additive such as a lubricant, plasticizer, flame retardant, antistatic agent, or the like, may be added to the resin, as needed.

When the polypropylene resin defined above is used as a raw material, the β-form is generated in a proportion of 1% or more and less than 20% at the time of forming a cast raw sheet, as a result of which the surface thereof is suitably roughened without generating an excessively roughened surface, and thus the cast raw sheet for a capacitor film with a high voltage resistance can be produced.

As a method for forming the polypropylene cast raw sheet according to the present invention, various known methods may be used without any particular limitations. For example, a raw pellet containing the polypropylene resin is filled into an extruder, and heated and melted. Then, the resultant is passed through a filter, and then heated and melted at 170° C. to 320° C., and more preferably 200° C. to 300° C., to be extruded from a T-die. Then, the resultant is cooled and solidified on at least one metal drum whose temperature is maintained at 70° C. to 140° C., and preferably 80° C. to 120° C., to form an unoriented cast raw sheet. Note that when plural metal drums are used, the temperature of the second or later metal drums is not limited to the above-described temperature range.

When the temperature of the first metal drum is maintained at 70° C. to 140° C., and preferably 80° C. to 120° C., the proportion of the β-form in the obtained cast raw sheet is 1% or more and less than 20%. Note that this range is applicable when a β-form nucleating agent is not used. Although the thickness of the cast raw sheet is not particularly limited, the thickness is generally 0.05 mm to 2 mm, and preferably 0.1 mm to 1 mm.

The polypropylene cast raw sheet according to the present invention can be made to be oriented (drawn) to form an oriented (drawn) film. The orientation (drawing) is preferably conducted by biaxial orientation, which makes orientation in biaxial directions, that is, a longitudinal direction and a lateral direction, and more preferably by sequential biaxial orientation. The sequential biaxial orientation is conducted as follows, for example, The cast raw sheet is maintained at 100° C. to 160° C., passed through rolls rotating at different rates so as to draw the sheet in a flow direction to obtain a 3- to 7-fold length. After the oriented (drawn) film is immediately cooled to room temperature, the film is directed to a tenter, and drawn in a width direction while maintaining the temperature thereof at 160° C. or more, so as to obtain a 3- to 11-fold width, followed by relaxing, heat-setting, and then winding the oriented (drawn) film. By this orientation step, an oriented film that is excellent in mechanical strength and stiffness and has a surface finely roughened with distinct unevenness is obtained.

Since the cast raw sheet is extremely excellent in extensibility, an extremely thin oriented film can be formed. The thickness of the oriented film is 1 μm or more and 7 μm or less, and preferably 1 μm or more and 4 μm or less. Since this oriented film has a finely roughened surface, the film has an excellent processing suitability for winding elements. Also, the oriented film is very thin while maintaining a high voltage resistance, so can easily realize a high electric capacity. Thus, this oriented film is extremely suitable as an oriented film for a capacitor.

The capacitor oriented film according to the present invention may be subjected to a corona discharge treatment conducted on-line or off-line after orientating and heat-setting the film, so as to enhance the adhesiveness thereof in a metal depositing process. Although the corona discharge treatment may be conducted in accordance with a generally known method without problems, the corona discharge treatment is preferably conducted in the presence of an atmospheric gas such as air, carbon dioxide gas, nitrogen gas, or a mixture thereof.

As described above, since the polypropylene cast raw sheet according to the present invention has both a high crystallinity and a high extensibility, an extremely thin film with a high voltage resistance can be provided, and so a capacitor with a high electric capacity can be provided. Moreover, since the film has a moderately fine surface roughness, the film is excellent in processing suitability for winding elements or the like.

EXAMPLES

In the following, although the present invention will be more specifically explained by way of examples, it is apparent that the present invention is not limited to these. Also, "parts" and "%" used in the examples indicate "parts by mass" and "% by mass" unless otherwise so indicated.
Method for Measuring Characteristic Values and Method for Evaluating Effects In examples, measurement of characteristic values and evaluation of effects were conducted as follows.

(1) Measurement of Weight Average Molecular Weight (Mw) and Molecular Weight Distribution (Mw/Mn).

GPC (gel permeation chromatography) was used under the following conditions.

Measuring Instrument: Differential refractometer (RI) built-in high-temperature GPC manufactured by TOSOH CORPORATION under the trade name of HLC-8121 GPC-HT type.

Column: Three connected TSK gel GMHHR-H(20) HT manufactured by TOSOH CORPORATION.
Column temperature: 145° C.
Eluant: Trichlorobenzene
Flow rate: 1.0 ml/min The calibration curve was formed using a standard polystyrene manufactured by TOSOH CORPORATION and resultants were converted into values of the polypropylene.

(2) Measurement of the Distribution of the Stereoregularity by Conducting Sequential Extraction.

The polypropylene resin was sufficiently dissolved in xylene (1) under reflux, and then left to stand still at room temperature for 4 hours. Components insoluble in xylene were separated by filtration, and subjected to the following extractions. A soluble component was dried to remove xylene, and weighed. This mass was considered as the content of an atactic component. The components insoluble in xylene were subjected to Soxhlet extractions sequentially using n-pentane (2), n-hexane (3), and n-heptane (4) with a Soxhlet type of fat extraction apparatus each for 6 hours. An extraction residue finally obtained as a component insoluble in n-heptane was weighed, and the mass thereof was considered as the content of an isotactic component. On the other hand, components soluble in the solvents (2) to (4) were weighed together, and the total mass thereof was considered as the content of stereoblock components. The contents of each of the components were expressed by percentage with respect to the total mass of the polypropylene resin before being dissolved in xylene.

(3) Measurement of Crystallization Rate ($1/t_{1/2}$)

The crystallization rate ($1/t_{1/2}$) of the polypropylene resin was determined by measuring the change of calorimetric value at a crystallization temperature of 120° C. using a power-compensation type DSC (Diamond DSC manufactured by PerkinElmer, Inc.) as follows.

First, 5 mg of a polypropylene resin pellet was filled into an aluminum sample holder, placed at a DSC, heated to 230° C., and then melted for 5 minutes. After that, the sample was cooled to a crystallization temperature of 120° C. at a rate of 100° C./min, and maintained at the same temperature so as to measure the change of the calorimetric value. When the temperature of the sample reached 120° C.±0.1° C., the time t was set as 0. Then, the calorimetric value integrated with time t was measured. As described above, the crystallization rate ($1/t_{1/2}$) was calculated as an inverse of a half time ($t_{1/2}$) at which the integrated calorimetric value reached 50% of the total calorimetric value.

(4) Measurement of β-Form Proportion

The proportion of β-form in a cast raw sheet was evaluated using the K value determined by X-ray diffraction intensity.

The X-ray diffraction intensity was measured under the following conditions.

Measuring instrument: X-ray diffractometer (RINT-2200 manufactured by Rigaku Corporation).
X-ray source: CuKα line.
Irradiation output: 40 KV-40 mA.
Scattering slit: 1 deg.
Receiving slit: 0.3 mm.
Scanning rate: 1 deg/min.

The K value was calculated using an intensity curve formed by the measurement. In more detail, the K value was calculated by summing the intensity of three diffraction peaks of an α-form origin and dividing the sum by the intensity of one diffraction peak of a β-form origin in accordance with the following formula:

$$K\text{ value(intensity ratio \%)} = H_\beta/(H_\beta + H_{\alpha I} + H_{\alpha II} + H_{\alpha III}) \times 100$$

(in which $H_\beta$ is the intensity (height) of a peak corresponding to the diffraction of β-form (2θ=16 deg), $H_{\alpha I}$ is the intensity (height) of a peak corresponding to the diffraction of α-form (110) face, $H_{\alpha II}$ is the intensity (height) of a peak corresponding to the diffraction of α-form (040) face, and $H_{\alpha III}$ is the intensity (height) of a peak corresponding to the diffraction of α-form (130) face, and each intensity (height) does not include amorphous diffraction).

(5) Measurement of Film Thickness

The thickness of a biaxially oriented film is measured using a micrometer (JIS-B7502) in accordance with JIS-C2330.

(6) Evaluation of the Degree of Fine Surface Roughness of a Film (Haze Value)

The degree of fine surface roughness of a biaxially oriented film was evaluated in accordance with JIS-C2330 using a haze value. The haze value changes due to the scattering of light on the surface of a transparent film, and so was used for indirectly evaluating the surface roughness of the film.

(7) Evaluation of Voltage Resistance.

The voltage resistance of a biaxially oriented film was evaluated in accordance with JIS-C2151 and JIS-C2330. In this evaluation, the value calculated by dividing the measured voltage level by the thickness of the film was used as a dielectric breakdown voltage level.

(8) Total Evaluation as a Biaxially Oriented Film for a Capacitor

The film was totally evaluated with respect to the suitability for a capacitor film by evaluating the film in terms of the possibility of producing a thin film required for improving the capacitance, the possibility of making the fine surface roughness required for winding elements, and the possibility of improving the voltage resistance. The evaluation was conducted in accordance with the following criteria.

A—Superior to the prior art film.
B—The same as the prior art film.
C—Inferior to the prior art film and unsuitable for a capacitor film.

Example 1

A polypropylene resin pellet of which the weight average molecular weight (Mw) was $3.7 \times 10^5$, the molecular weight distribution (Mw/Mn) was 7.9, the proportion of isotactic component was 97.8%, and the proportion of stereoblock component was 1.3% was prepared by slurry polymerization. The polypropylene resin pellet was filled into an extruder, melted at a resin temperature of 280° C., extruded from a T-die, and cast on to a metal drum of which the surface temperature was maintained at 90° C. so that the extruded resin was solidified. Thus, a cast raw sheet with a thickness of approximately 200 μm was obtained. The crystallization rate of the polypropylene resin pellet before extrusion was 0.9 $\text{min}^{-1}$. The β-form proportion (K value) of the obtained cast raw sheet was 12%.

Then, this unoriented cast raw sheet was drawn in a flow direction at 130° C. to gain a five-fold length, and then immediately cooled to room temperature. Then, the resultant was drawn in a width direction at 160° C. using a tenter to gain a ten-fold width. Thus, a biaxially oriented polypropylene thin film with a thickness of 4.0 μm was obtained. The haze value of the film was 3.7%, which revealed that the surface thereof was suitably roughened, and so the film was suitable for winding elements. The dielectric breakdown voltage level was 0.51 kV/μm, that is, the film had a high voltage resistance. In Table 1, results of characteristics of the resin and the cast raw sheet and evaluation of the biaxially oriented film are shown together.

Example 2

A cast raw sheet with a thickness of approximately 150 μm was prepared in a similar manner to that of Example 1, except that a polypropylene of which the weight average molecular weight (Mw) was $3.6 \times 10^5$, the molecular weight distribution (Mw/Mn) was 8.2, the proportion of isotactic component was 97.8%, and the proportion of stereoblock component was 1.3%, the resin pellet being prepared by slurry polymerization, was used instead of the resin pellet of Example 1. The crystallization rate of the polypropylene resin pellet before extrusion was 0.8 $\text{min}^{-1}$. The β-form proportion (K value) of the cast raw sheet was 14%.

This unoriented cast raw sheet was drawn in a similar manner to that of Example 1 to obtain a biaxially oriented polypropylene thin film with a thickness of 3.0 μm. The haze value of the film was 3.9%, which revealed that the surface thereof was suitably roughened, and so the film was suitable for winding elements. The dielectric breakdown voltage level was 0.62 kV/μm, that is, the film had a high voltage resistance. In Table 1, results of characteristics of the resin and the cast raw sheet and evaluation of the biaxially oriented film are shown together.

Example 3

A cast raw sheet with a thickness of approximately 140 μm was prepared in a similar manner to that of Example 1, except that a polypropylene of which the weight average molecular weight (Mw) was $2.9 \times 10^5$, the molecular weight distribution (Mw/Mn) was 7.1, the proportion of isotactic component was 97.2%, and the proportion of stereoblock component was 0.9%, the resin pellet being prepared by slurry polymerization, was used instead of the resin pellet of Example 1. The crystallization rate of the polypropylene resin pellet before extrusion was 1.1 $\text{min}^{-1}$. The β-form proportion (K value) of the cast raw sheet was 9%.

This unoriented cast raw sheet was drawn in a similar manner to that of Example 1 to obtain a biaxially oriented polypropylene thin film with a thickness of 2.8 μm. The haze value of the film was 3.1%, and so the film was suitable for winding elements. The dielectric breakdown voltage level was 0.49 kV/μm, that is, the film had a high voltage resistance. In Table 1, results of characteristics of the resin and the cast raw sheet and evaluation of the biaxially oriented film are shown together.

Example 4

An unoriented cast raw sheet was prepared in a similar manner to that of Example 1, except that the surface temperature of the metal drum for forming the sheet was set at 120° C. The β-form proportion (K value) of the sheet was 17%. From this unoriented cast raw sheet, a biaxially oriented polypropylene thin film with a thickness of 4.0 μm was prepared in a similar manner to that of Example 1. The haze value of the film was 4.1%, which revealed that the film surface was suitably roughened, and so the film was suitable for winding elements. The dielectric breakdown voltage level was 0.50 kV/μm, that is, the film had a high voltage resistance. In Table 1, results of characteristics of the resin and the cast raw sheet and evaluation of the biaxially oriented film are shown together.

Comparative Example 1

A cast raw sheet with a thickness of approximately 150 μm was prepared in a similar manner to that of Example 1, except that a polypropylene of which the weight average molecular weight (Mw) was $3.5 \times 10^5$, the molecular weight distribution (Mw/Mn) was 7.0, the proportion of isotactic component was 93.7%, and the proportion of stereoblock component was 4.7%, the resin pellet being prepared by vapor phase polymerization, was used instead of the resin pellet of Example 1. The crystallization rate of the polypropylene resin pellet before extrusion was 0.4 $min^{-1}$. The β-form proportion (K value) of the cast raw sheet was 21%.

This unoriented cast raw sheet was drawn in a similar manner to that of Example 1 to obtain a biaxially oriented polypropylene thin film with a thickness of 3.0 μm. The haze value of the film was 7.8%, which revealed that the surface was roughened and so the film was suitable for winding elements. However, the dielectric breakdown voltage level was 0.28 kV/μm, that is, the voltage resistance of the film was merely the same level as that of the prior art. In Table 1, results of characteristics of the resin and the cast raw sheet and evaluation of the biaxially oriented film are shown together.

Comparative Example 2

A cast raw sheet with a thickness of approximately 200 μm was prepared in a similar manner to that of Example 1, except that a polypropylene of which the weight average molecular weight (Mw) was $2.5 \times 10^5$, the molecular weight distribution (Mw/Mn) was 4.4, the proportion of isotactic component was 97.1%, and the proportion of stereoblock component was 1.4%, the resin pellet being prepared by bulk polymerization, was used instead of the resin pellet of Example 1. The crystallization rate of the polypropylene resin pellet before extrusion was 0.9 $min^{-1}$. The β-form proportion (K value) of the cast raw sheet was 28%.

Although this unoriented cast raw sheet was drawn in a similar manner to that of Example 1, tears frequently occurred, and a biaxially oriented polypropylene thin film with a thickness of 7 μm or less could not be formed. In Table 1, results of characteristics of the resin and the cast raw sheet are shown together.

Comparative Example 3

A cast raw sheet with a thickness of approximately 200 μm was prepared in a similar manner to that of Example 1, except that a polypropylene resin pellet of which the weight average molecular weight (Mw) was $3.1 \times 10^5$, the molecular weight distribution (Mw/Mn) was 4.6, the proportion of isotactic component was 95.7%, and the proportion of stereoblock component was 2.4%, the resin pellet being prepared by bulk polymerization, was used instead of the resin pellet of Example 1. The crystallization rate of the polypropylene resin pellet before extrusion was 0.5 $min^{-1}$. The β-form proportion (K value) of the cast raw sheet was 25%.

This unoriented cast raw sheet was drawn in a similar manner to that of Example 1 to obtain a biaxially oriented polypropylene thin film with a thickness of 4.0 μm. The haze value was 4.7%, which revealed that the surface was suitably roughened and so the film was suitable for winding elements. However, the dielectric breakdown voltage level was 0.32 kV/μm, that is, the voltage resistance of the film was merely the same level as that of the prior art. In Table 1, results of characteristics of the resin and the cast raw sheet and evaluation of the biaxially oriented film are shown together.

Comparative Example 4

An unoriented cast raw sheet was prepared in a similar manner to that of Example 1, except that the temperature of the metal drum at the time of forming the sheet was set at 30° C. The β-form proportion (K value) of the sheet was 0%.

From this unoriented cast raw sheet, a biaxially oriented polypropylene thin film with a thickness of 4.0 μm was obtained in a similar manner to that of Example 1. The haze value of the film was 0.1%, which revealed that the surface was scarcely roughened and so the film was unsuitable for winding elements. However, the dielectric breakdown voltage level was 0.56 kV/μm, that is, the film had a high voltage resistance. In Table 1, results of characteristics of the resin and the cast raw sheet and evaluation of the biaxially oriented film are shown together.

Comparative Example 5

An unoriented cast raw sheet was prepared in a similar manner to that of Example 1, except that the temperature of the metal drum at the time of forming the sheet was set at 70° C. The β-form proportion (K value) of the sheet was 15%.

From this unoriented cast raw sheet, a biaxially oriented polypropylene thin film with a thickness of 4.0 μm was obtained in a similar manner to that of Example 1. The haze value of the film was 3.9%, which revealed that the surface was suitably roughened and so the film was suitable for winding elements. However, the dielectric breakdown voltage level was 0.39 kV/μm, that is, the voltage resistance of the film was merely the same level as that of the prior art. In Table 1, results of characteristics of the resin and the cast raw sheet and evaluation of the biaxially oriented film are shown together.

TABLE 1

|  | Polymerization Method | Weight average molecular weight (Mw/$10^5$) | Molecular weight distribution (Mw/Mn) | Isotactic Proportion (% by mass) | Stereoblock Proportion (% by mass) | Crystallization rate $1/t_{1/2}$ ($m^{-1}$) |
|---|---|---|---|---|---|---|
| Example 1 | Slurry polymerization | 3.7 | 7.9 | 97.8 | 1.3 | 0.9 |

TABLE 1-continued

| | | | | | | |
|---|---|---|---|---|---|---|
| Example 2 | Slurry polymerization | 3.6 | 8.2 | 97.8 | 1.3 | 0.8 |
| Example 3 | Slurry polymerization | 2.9 | 7.1 | 97.2 | 0.9 | 1.1 |
| Example 4 | Slurry polymerization | 3.7 | 7.9 | 97.8 | 1.3 | 0.9 |
| Comparative Example 1 | Vapor phase polymerization | 3.5 | 7.0 | 93.7 | 4.7 | 0.4 |
| Comparative Example 2 | Bulk polymerization | 2.5 | 4.4 | 97.1 | 1.4 | 0.9 |
| Comparative Example 3 | Bulk polymerization | 3.1 | 4.6 | 95.7 | 2.4 | 0.5 |
| Comparative Example 4 | Slurry polymerization | 3.7 | 7.9 | 97.8 | 1.3 | 0.9 |
| Comparative Example 5 | Bulk polymerization | 3.1 | 4.6 | 95.7 | 2.4 | 0.5 |

| | β-form proportion (%) | Film thickness (μm) | Haze Value (%) | Dielectric breakdown voltage (KV/μm) | Total evaluation |
|---|---|---|---|---|---|
| Example 1 | 12 | 4.0 | 3.7 | 0.51 | A |
| Example 2 | 14 | 3.0 | 3.9 | 0.62 | A |
| Example 3 | 9 | 2.8 | 3.1 | 0.49 | A |
| Example 4 | 17 | 4.0 | 4.1 | 0.50 | A |
| Comparative Example 1 | 21 | 3.0 | 7.8 | 0.28 | B |
| Comparative Example 2 | 28 | Oriented film with a thickness of 7 μm or less could not be formed. | | | C |
| Comparative Example 3 | 25 | 4.0 | 4.7 | 0.32 | B |
| Comparative Example 4 | 0 | 4.0 | 0.1 | 0.56 | C |
| Comparative Example 5 | 15 | 4.0 | 3.9 | 0.39 | B |

As is apparent from the results of Examples 1 to 3, when the polypropylene resin was prepared by slurry polymerization, a resin having a defined range of the weight average molecular weight, a broad range of the molecular weight distribution, and a high proportion of isotactic component, was formed into a cast raw sheet, and the β-form was not excessively generated. When the sheet was formed into a biaxially oriented film, the surface of the film was suitably finely roughened, and thus the film was excellent in processing suitability. Also, the cast raw sheet was extremely excellent in extensibility, and so could form an extremely thin biaxially oriented film. In addition, this oriented film had a high voltage resistance.

Moreover, as shown by the results of Example 4 in which the temperature of the metal drum at the time of forming the cast raw sheet was varied, it was demonstrated that the effects of the present invention could be exhibited, provided that the temperature was set within the above-mentioned range.

On the other hand, in the case of the cast raw sheet using the polypropylene resin of which the molecular weight, the molecular weight distribution, and the proportion of isotactic component were outside the above-defined range, there could not be obtained biaxially oriented polypropylene thin films with a finely roughened surface excellent in the processing suitability for winding elements or the like together high voltage resistance (Comparative Examples 1 to 3).

Even if the polypropylene resin with the above-defined range of the weight average molecular weight, the molecular weight distribution, and the proportion of isotactic component was used, when the temperature of the metal drum for casting was set within the same range as that of a conventional method for manufacturing an oriented film for a packaging material, for example, the β-form proportion could not fall within the above-defined range and so the effects of the present invention, which are preferable from the standpoint of an oriented polypropylene film for a capacitor, could not be exhibited, (Comparative Example 4).

In the case of the sheet prepared by using the polypropylene resin of which the molecular weight, the molecular weight distribution, and the proportion of isotactic component were outside the above-defined range while controlling casting conditions so that the β-form proportion fell within the above-defined range, the haze value decreased, so the surface was smoothed. However, the voltage resistance of the obtained film was not so enhanced and stayed at the same level as that of the prior art, and thus the preferable characteristics of the oriented polypropylene film for a capacitor could not be obtained (Comparative Example 5).

As described above, the cast raw sheet with a moderate β-form proportion, prepared from the polypropylene resin of which the molecular weight, the molecular weight distribution, and the proportion of isotactic component fell within the above-defined range, enabled the formation of a biaxially oriented film having an extremely thin film thickness, a high voltage resistance, and a finely roughened surface excellent in processing suitability for winding elements or the like, the film being extremely suitable for a capacitor film.

What is claimed is:
1. A capacitor film prepared by biaxially drawing a cast raw sheet, wherein the cast raw sheet is prepared by heating and melting a polypropylene resin and extruding the resin from a T-die, wherein the extruded resin is cooled and solidified on at least one metal drum, the temperature of which is maintained at 90 to 120° C., wherein the polypropylene resin has:

a weight average molecular weight, determined by gel permeation chromatography, of 290,000 or more and 370,000 or less; and a molecular weight distribution Mw/Mn of 7.1 to 8.2;

wherein the resin comprises;

an isotactic component in a proportion of 97.2-97.8% by mass when measured by sequential extraction, and a stereoblock component in a proportion of 0.9% by mass or more and 1.3% by mass or less, when measured by said sequential extraction as the proportion soluble in n-pentane, n-hexane and n-heptane;

wherein the cast raw sheet comprises a β-form in a proportion of 9% or more and 17% or less, the proportion being determined by X-ray diffraction intensity; and wherein the film has a thickness of 2.8 μm to 4.0 μm.

2. The capacitor film according to claim 1, wherein the polypropylene resin is prepared by subjecting a propylene monomer to a slurry polymerization, and the slurry polymerization of the propylene monomer is a multistage polymerization reaction using plural polymerization reactors.

3. The capacitor film according to claim 1, wherein the polypropylene resin has a crystallization rate $1/t_{1/2}$ of 0.6 $min^{-1}$ or more and less than 3 $min^{-1}$, the crystallization rate being determined at a crystallization temperature of 120° C. using a differential scanning calorimeter.

4. The capacitor film according to claim 1, wherein the film has a haze value of 3.1 to 4.1%.

5. A method of producing a capacitor film, comprising:
a first step of preparing a raw pellet containing a polypropylene resin,
wherein the resin has a weight average molecular weight, determined by gel permeation chromatography, of 290,000 or more and 370,000 or less; and a molecular weight distribution Mw/Mn of 7.1 to 8.2; and wherein the resin comprises an isotactic component in a proportion of 97.2-97.8% by mass when measured by sequential extraction, and a stereoblock component in a proportion of 0.9% by mass or more and 1.3% by mass or less, when measured by said sequential extraction as the proportion soluble in n-pentane, n-hexane and n-heptane, a second step of heating and melting the raw pellet at 170° C. to 320° C.;

a third step of extruding the resin composition obtained by the second step from a T-die;

a fourth step of cooling and solidifying the resin composition obtained by the third step on at least one metal drum, the temperature of which maintaining at 90° C. to 120° C. to obtain an un oriented cast raw sheet, wherein the unoriented cast raw sheet comprises a β-form in a proportion of 9% or more and 17% or less, the proportion being determined by X-ray diffraction intensity; and a fifth step of biaxially drawing the unoriented cast raw sheet obtained by the fourth step to obtain the capacitor film wherein the film has a thickness of 2.8 μm to 4.0 μm.

6. The method according to claims 5, wherein the polypropylene resin has a crystallization rate $1/t_{1/2}$ of 0.6 $min^{-1}$ or more and less than 3 $min^{-1}$, the crystallization rate being determined at a crystallization temperature of 120° C. using a differential scanning calorimeter.

\* \* \* \* \*

UNITED STATES PATENT AND TRADEMARK OFFICE
CERTIFICATE OF CORRECTION

PATENT NO. : 9,548,160 B2
APPLICATION NO. : 11/599537
DATED : January 17, 2017
INVENTOR(S) : Tadakazu Ishiwata Page 1 of 1

It is certified that error appears in the above-identified patent and that said Letters Patent is hereby corrected as shown below:

On the Title Page

In Column 2 (item (56)) at Line 18, under Other Publications, change "istotactic polyproylene:" to --isotactic polypropylene:--.

In Column 2 (item (56)) at Line 24, under Other Publications, change "Plymer," to --Polymer,--.

In Column 2 (item (56)) at Line 27, under Other Publications, change "Makrorno1." to --Makromol.--.

In Column 2 (item (56)) at Line 29, under Other Publications, change "Gijyutsu" to --Gijutsu--.

In the Specification

In Column 1 at Line 47, change "GIJYUTSU" to --GIJUTSU--.

In Column 3 at Line 1, change "(I)," to --(1),--.

In Column 10 at Line 4, after "Trichlorobenzene" insert --.--.

In Column 10 at Line 5, after "ml/min" insert --.--.

In the Claims

In Column 18 at Line 19, in Claim 5, change "un oriented" to --unoriented--.

In Column 18 at Line 29 (approx.), in Claim 6, change "claims" to --claim--.

In Column 18 at Line 30 (approx.), in Claim 6, change "$1/_{t1/2}$" to --$1/t_{1/2}$--.

Signed and Sealed this
Tenth Day of April, 2018

Andrei Iancu
*Director of the United States Patent and Trademark Office*